(12) United States Patent
Cho (10) Patent No.: US 11,103,824 B2
(45) Date of Patent: Aug. 31, 2021

(54) VACUUM PUMP AND ARRAY THEREOF (71) Applicant: VTEC CO., LTD., Busan (KR)

(72) Inventor: Ho-Young Cho, Seoul (KR)

(73) Assignee: VTEC CO., LTD., Busan (KR)

( * ) Notice: Subject to any disclaimer, the term of this patent is extended or adjusted under 35 U.S.C. 154(b) by 321 days.

(21) Appl. No.: 16/324,293

(22) PCT Filed: Jul. 3, 2017

(86) PCT No.: PCT/KR2017/007005
§ 371 (c)(1),
(2) Date: Feb. 8, 2019

(87) PCT Pub. No.: WO2018/043900
PCT Pub. Date: Mar. 8, 2018

(65) Prior Publication Data
US 2019/0168153 A1   Jun. 6, 2019

(30) Foreign Application Priority Data

Sep. 1, 2016 (KR) .......................... 10-2016-0112330

(51) Int. Cl.
*B01D 46/00* (2006.01)
*B01D 46/42* (2006.01)
(Continued)

(52) U.S. Cl.
CPC ..... *B01D 46/0068* (2013.01); *B01D 46/0005* (2013.01); *F04F 5/20* (2013.01);
(Continued)

(58) Field of Classification Search
CPC ............ B01D 46/0005; B01D 46/0068; B01D 46/52; B01D 46/42; F05B 2260/601;
(Continued)

(56) References Cited

U.S. PATENT DOCUMENTS 4,395,202 A   7/1983   Tell
4,466,778 A   8/1984   Volkmann
(Continued)

FOREIGN PATENT DOCUMENTS

KR   100629994 B1   9/2006
KR   100645273 B1   11/2006
(Continued)

OTHER PUBLICATIONS

International Search Report dated Oct. 26, 2017 from PCT Application No. PCT/KR2017/007005.

*Primary Examiner* — Minh Chau T Pham
(74) *Attorney, Agent, or Firm* — Innovation Capital Law Group, LLP; Vic Lin (57) ABSTRACT

Disclosed is a compact vacuum pump including a housing having an internal vacuum chamber, an ejector pump axially mounted in the vacuum chamber, and an air filter coaxially mounted on the ejector pump. The housing has two separate compressed air supply lines one of which is a vacuum creation line extending to the inlet port of the ejector pump via a first supply line and the other of which is a vacuum release line extending to a gap between the ejector pump and the air filter via a second supply line. The vacuum pump is of a coaxial arrangement type and has a vacuum release function and a filter cleaning function.

7 Claims, 5 Drawing Sheets

(51) Int. Cl.
*F04F 5/20* (2006.01)
*F04F 5/42* (2006.01)
*F04F 5/44* (2006.01)
*F04F 5/46* (2006.01)
*F04F 5/52* (2006.01)
*F04F 5/54* (2006.01)

(52) U.S. Cl.
CPC .................. *F04F 5/44* (2013.01); *F04F 5/54* (2013.01); *F05B 2260/601* (2013.01)

(58) Field of Classification Search
CPC ........ F04F 5/54; F04F 5/20; F04F 5/44; F04F 5/52; F04F 5/466; F04F 5/14; F04F 5/22
USPC ......... 55/385.1; 417/76, 151, 174, 187, 189, 417/181; 210/104, 137; 100/102; 73/421.5 R
See application file for complete search history.

(56) References Cited

U.S. PATENT DOCUMENTS

| | | | |
|---|---|---|---|
| 4,759,691 A | 7/1988 | Kroupa | |
| 4,790,054 A | 12/1988 | Nichols | |
| 4,880,358 A | 11/1989 | Lasto | |
| 5,169,293 A | 12/1992 | Yamamoto | |
| 5,228,839 A | 7/1993 | Peterson et al. | |
| 5,683,227 A | 11/1997 | Nagai et al. | |
| 6,155,795 A | 12/2000 | Schmalz et al. | |
| 6,561,769 B1 * | 5/2003 | Tell | F04F 5/467 417/151 |
| 6,729,852 B2 | 5/2004 | Schnatterer | |
| 8,231,358 B2 * | 7/2012 | Cho | F04F 5/52 417/187 |
| 9,322,308 B2 * | 4/2016 | Watanabe | F01N 1/003 |
| 2008/0292476 A1 * | 11/2008 | Cho | F04F 5/467 417/174 |
| 2014/0014746 A1 * | 1/2014 | Watanabe | F01N 1/003 239/584 |
| 2017/0037874 A1 * | 2/2017 | Cho | B25J 15/0675 |
| 2019/0143536 A1 * | 5/2019 | Tell | F04F 5/52 294/64.3 |

FOREIGN PATENT DOCUMENTS

| | | |
|---|---|---|
| KR | 100730323 B1 | 6/2007 |
| KR | 101251825 B1 | 4/2013 |
| KR | 101610491 B1 | 4/2016 |
| KR | 20160092041 A | 8/2016 |

* cited by examiner

[Fig. 1]

Prior Art

VACUUM PUMP AND ARRAY THEREOF

TECHNICAL FIELD

The present invention relates to a vacuum pump operated with high-speed compressed air and used to generate a vacuum or negative pressure by exhausting a specific space.

BACKGROUND ART

A typical vacuum pump includes a housing having a vacuum chamber formed therein, a suction port formed at a region of one side of the housing and configured to communicate with the vacuum chamber, and an ejector pump provided inside or outside the housing and configured to communicate with the vacuum chamber. In addition, an adsorption suction pad is provided to communicate with the vacuum chamber through the suction port.

When high-speed compressed air is discharged through an ejector pump with an adsorption pad being in contact with an object, the air in the adsorption pad is drawn into the ejector pump through the suction port and the vacuum chamber and is then discharged to the outside of the vacuum pump along with the compressed air. As a result, a vacuum or negative pressure is generated in the adsorption pad. The object in contact with the adsorption pad is strongly adsorbed onto the surface of the adsorption pad due to the generated negative pressure, and the adsorbed object is transported to a target place predetermined by, for example, an automation system.

When the transportation of the object to the exact target position is completed, the vacuum or negative pressure is released by vacuum-releasing air that is supplied to the vacuum chamber, and then the vacuum pump is prepared for transfer of the next object.

In terms of wiring, a structure in which an ejector pump is provided inside a housing is advantageous over a structure in which an ejector pump is provided outside a housing because the former structure enables a compact structure of vacuum pump. An example of this type of a vacuum pump is disclosed in Korean Patent No. 10-0645273, titled "Vacuum Pump and Assembly of Vacuum Pump Filter and Silencer".

Figure 1:
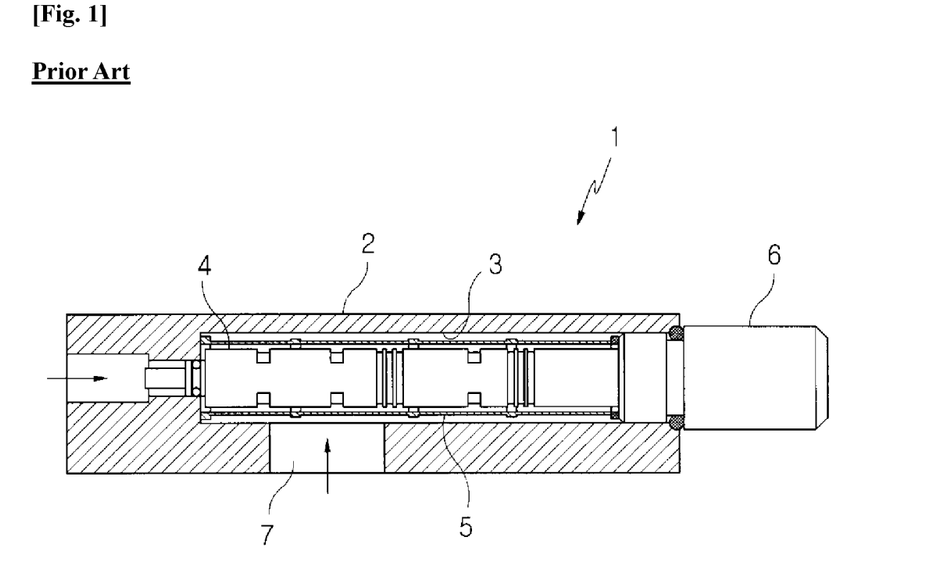
FIG. 1 is a cross-sectional view of a vacuum pump assembly according to a related art.

Referring to FIG. 1, the disclosed assembly 1 includes the housing 2 having the vacuum chamber 3 formed therein, the ejector pump 4 mounted to extend in a longitudinal (axial) direction in the vacuum chamber 3, and the cylindrical porous air filter 5 coaxially arranged outside the ejector pump 4. In FIG. 1, reference numeral 6 denotes a silencer connected to the outlet of the ejector pump 4.

The assembly 1 is configured such that air in the adsorption pad (not shown) is introduced into the ejector pump 4 and is purged by high-speed compressed air passing through the ejector pump 4 via the suction port 7 and the vacuum chamber 3, resulting in a negative pressure being generated in the adsorption pad. The air filter 5 filters out foreign matter contained in the air entering the ejector pump 4, thereby preventing the foreign matter from entering the ejector pump 4. Since there is a high likelihood that the nozzles of the ejector pump 4 are clogged due to the foreign matter detached from the surface of an object to be adsorption-transported, the air filter 5 is considered as one of the key components.

DISCLOSURE

Technical Problem

As described above, the assembly 1 has an advantage of being capable of realizing a compact vacuum pump because the ejector pump 4 and the air filter 5 are coaxially arranged in the housing 2. However, the assembly 1 has a problem that it can generate a vacuum pressure but cannot release the generated vacuum pressure. Therefore, in a case where this assembly 1 is used in conjunction with a vacuum transfer system, an additional vacuum release means needs to operate in conjunction with the assembly 1.

On the other hand, foreign matter may stick to the outer surface of the air filter 5 depending on the type and size of the foreign matter, resulting in clogging of the pores of the air filter 5. When the clogging occurs, the air filter 5 cannot normally function and a desired vacuum or negative pressure in the vacuum chamber 1 cannot be obtained Therefore, it is necessary to clean the air filter periodically. This causes an inconvenience that all the parts of the assembly 1 must be disassembled for cleaning of the air filter and then reassembled after the cleaning.

Nevertheless, conventional techniques fails to provide any solution to these problems. The present invention has been made to solve these problems occurring in the related art.

An objective of the present invention is to provide a vacuum pump having a structure in which a cylindrical filter is coaxially disposed outside an ejector pump, is capable of performing a vacuum creation operation and a vacuum release operation, and is designed such that foreign matter attached to the surface of the filter during the vacuum creation operation are detached from the filter during the vacuum release operation so that the filter can be cleaned naturally in a process of transferring an object by means of vacuum transfer.

Another objective of the present invention is to provide a vacuum pump array including two or more vacuum pumps connected in parallel and configured to share a compressed air supply line so that energy can be effectively used.

Technical Solution

According to one aspect of the present invention, there is provided a vacuum pump including:

a housing having a vacuum chamber formed therein and a side-mounted suction port that extends to the vacuum chamber; an ejector pump mounted to extend in an axial direction in the vacuum chamber; and an air filter coaxially mounted outside the ejector pump, in which the ejector pump is a pipe-type pump having a front end serving as an inlet port and a rear end serving as an outlet port, and has a through hole formed in a side wall thereof so as to communicate with the vacuum chamber, the air filter is a porous tubular filter, and the housing has two compressed air supply lines one of which is a vacuum creation line extending to the inlet port of the ejector pump through a first supply line and the other of which is a vacuum release line extending to a gap formed between the ejector pump and the air filter through a second supply line.

Preferably, the vacuum pump may further include a hollow closure member coupled to an opening of the housing to receive the rear end serving as the output portion of the ejector pump, thereby axially pressing the ejector pump disposed in the vacuum chamber such that the ejector pump is fixed not to be moved in the axial direction.

More preferably, the closure member may be composed of a silencer.

Preferably, the air filter may include a tubular filter body, and a rib-connecting reinforcing member fitted on an outer surface of the tubular filter body to prevent deformation of the tubular filter body;

the rib-connecting reinforcing member includes an inner annular protrusion protruding toward an outer surface of the inlet port of the ejector pump, and a hole formed to extend through the inner annular protrusion in the axial direction; and the vacuum release line extends to the gap through the second supply line and the hole formed in the inner annular protrusion.

Preferably, the air filter is fixed on the outer surface of the ejector pump in such a manner that the reinforcing members are fitted on and pressed against the outer surface of the inlet port and the outer surface of the outlet port of the ejector pump.

According to another aspect of the present invention, there is provided a vacuum pump array including:

two or more vacuum pumps each of which is the vacuum pump described above, the two or more vacuum pumps being arranged in parallel and the housings of the respective vacuum pumps are integrally formed, the suction port of each of the vacuum pumps is connected to communicate with the vacuum chamber of an adjacent vacuum pump of the vacuum pumps, and the first supply line and the second supply line of each of the vacuum pumps are connected to the first supply line and the second supply line of the adjacent vacuum pump, respectively.

Advantageous Effects

The vacuum pump of the present invention is based on a compact vacuum pump structure in which an ejector pump and an air filter are coaxially arranged. In addition, the vacuum pump is configured to have a vacuum creation line and a vacuum release line. Therefore, the vacuum pump according to the present invention can be optimally applied in a vacuum transfer system.

In addition, the vacuum pump according to the present invention has an advantage described below. When air contained in the adsorption pad is purged by the compressed air supplied through the vacuum creation line which means an air flow path in order of the air filter, the vacuum chamber, and the ejector pump, foreign matter adhering on the surface of an object (herein, referred to as a transfer target object) to be transferred by means of adsorption-transfer is detached from the transfer target object and is then attached to the outer surface of the air filter. Next, this foreign matter is detached and removed from the surface of the air filter by the compressed air supplied to the adsorption pad through the vacuum release line which means an air flow path in order of the vacuum chamber, the air filter, the suction port, and the adsorption pad.

Therefore, the air filter is naturally cleaned while a cycle of the vacuum creation and the vacuum release is continuously repeated in a vacuum transfer system.

Further, in the preferred embodiment, the air filter is self-fixed to the outer surface of the ejector pump. Therefore, it is convenient to maintain or handle the vacuum pump because the air filter and the ejector pump can be mounted in or dismounted from the vacuum chamber together.

The vacuum pumps according to the present invention can be assembled together to form a vacuum pump array in which two or more vacuum pumps described above are connected in parallel and the first supply line and the second supply line of each of the vacuum pumps are connected to the first supply line and the second supply line of the next vacuum pump, respectively. The vacuum pump array has an advantage of improving energy utilization efficiency and increasing the vacuum creation performance.

EXPLANATION OF REFERENCE NUMERALS IN THE DRAWINGS

| | |
|---|---|
| 10. Vacuum pump array | |
| 10a, 10b. Vacuum pump | |
| 20. Housing | |
| 21. Vacuum chamber | 22. First supply line |
| 23. Second supply line | 24. Gap |
| 25, 26. Supply port | 27. Suction port |
| 28. Opening | 29. Transparent window |
| 30. Ejector pump | |
| 31. Inlet port | 32. Outlet port |
| 33. Air hole | 34 Stopper |
| 40. Air filter | |
| 41. Filter body | 42 Reinforcing member |
| 43. Inner protrusion | 44 Hole |
| 50. Closure member | |
| 51. Sound absorbing member | |

Best Mode

Figure 2:
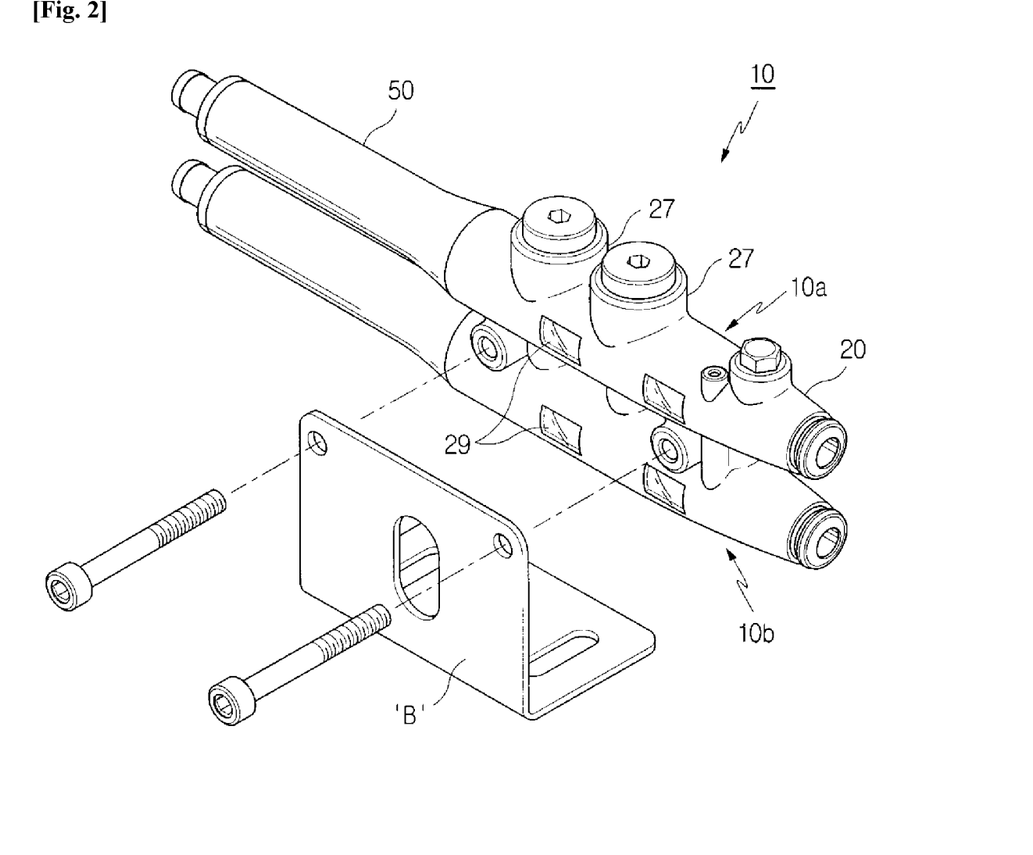
FIG. 2 is an external perspective view of a vacuum pump according to one embodiment of the present invention.

The features and operational effects of a vacuum pump and a vacuum pump array which are not described above will become apparent from the following embodiments described in detail below with reference to the accompanying drawings. In FIG. 2, vacuum pumps according to one embodiment of the present invention are denoted by reference numerals "10a" and "10b", and a vacuum pump array including the vacuum pumps 10a and 10b is denoted by reference numeral "10".

Figure 3:
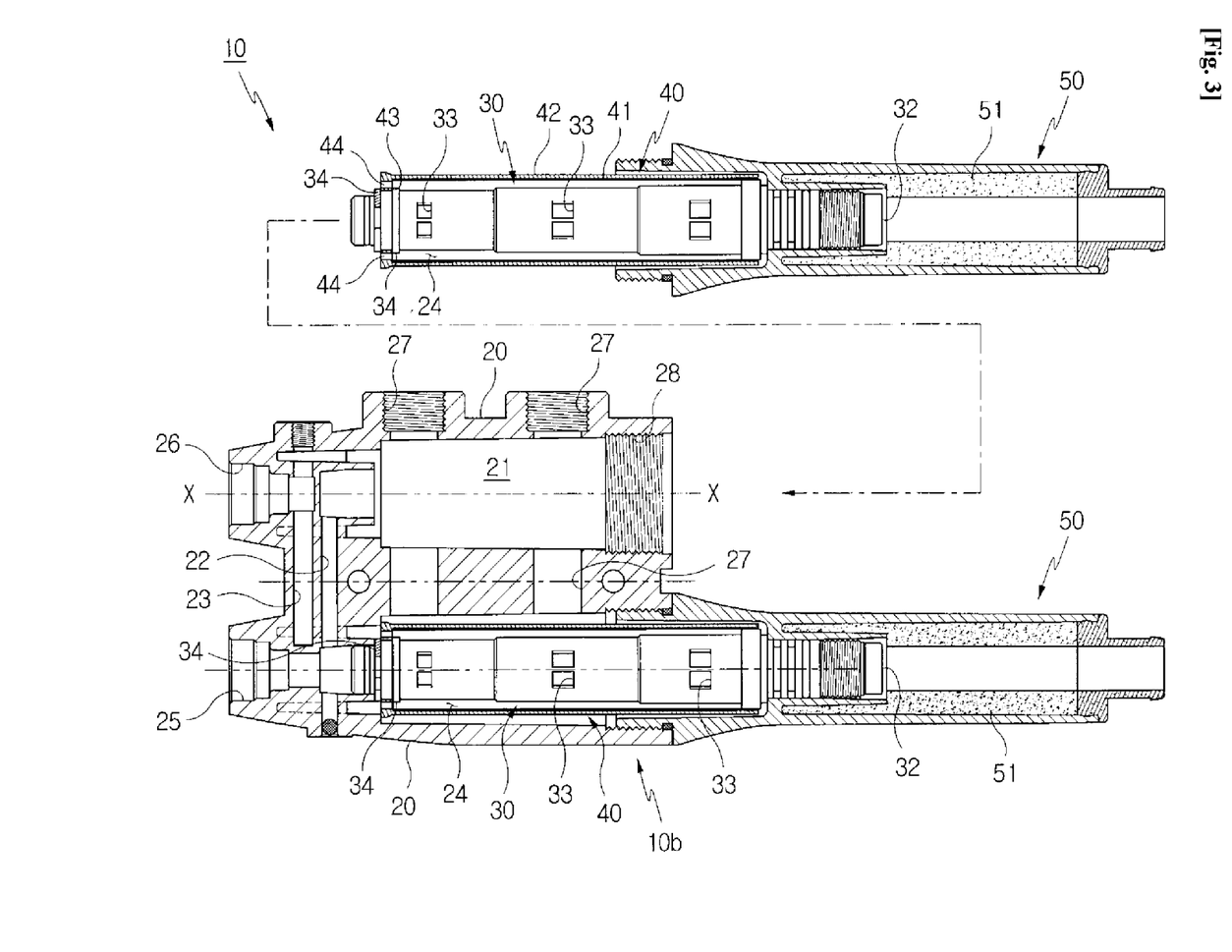
FIG. 3 is a cross-sectional view of the structure of FIG. 2.
Figure 4:
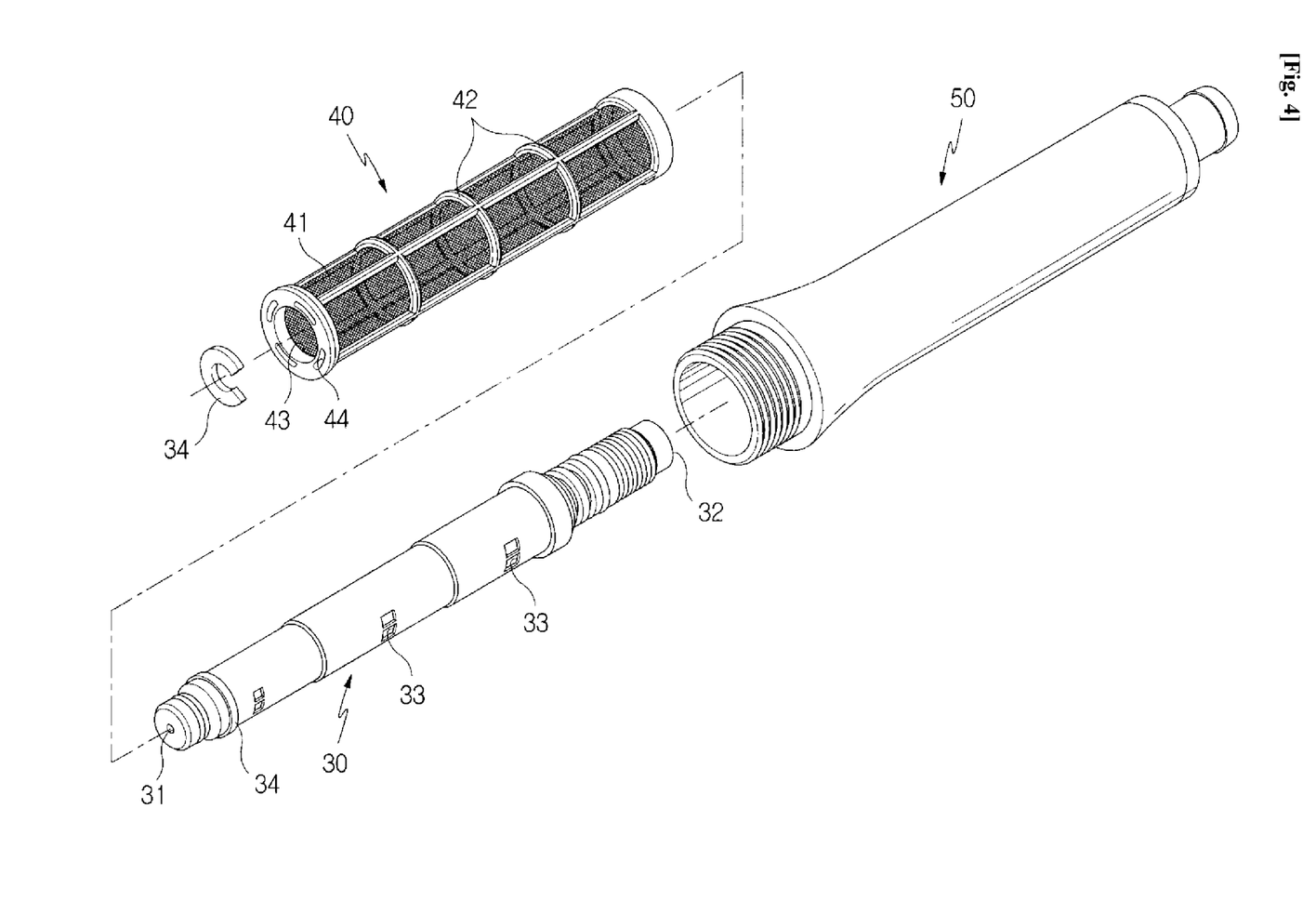
FIG. 4 is a partial exploded view of the structure of FIG. 3.

Referring to FIGS. 2 to 4, each of the vacuum pump 10a and 10b according to one embodiment of the present invention includes a housing 20 having a vacuum chamber 21 formed therein and a side-mounted suction port 27 extending to the vacuum chamber 21. Each of the vacuum pumps 10a and 10b further includes a pipe-type ejector pump 30 mounted to extend in an axial direction X-X within the vacuum chamber 21 and a tubular air filter 40 coaxially disposed outside the ejector pump 30. The reference character 'B' denotes a bracket for coupling the vacuum pumps 10a and 10b or the vacuum pump array 10 to a vacuum transfer system.

Here, the housing 20 has two compressed air supply lines provided on the front side thereof and spaced from each other. One of them is a vacuum creation line extending to an inlet port 31 of the ejector pump 30 via a first supply line 22 and the other is a vacuum release line extending to a gap 24 provided between the ejector pump 30 and the air filter 40 via a second supply line 23.

The reason why the vacuum release line extends to and through the gap 24 provided between the ejector pump 30 and the air filter 40 is that it is considered the best way to impart a vacuum release function and a filter cleaning function to the structure of each of the coaxial vacuum pumps 10a and 10b according to the present invention. At least one transparent window 29 is preferably formed at a region of the side wall of the housing 20 so that the air filter 40 can be visually checked for a contaminated state or a cleaned state.

In the drawings, reference numerals 25 and 26 denote compressed air supply ports for the vacuum creation and the vacuum release, respectively. The compressed air supply ports 25 and 26 are shared by each of the vacuum pumps 10a and 10b provided in the vacuum pump array 10. Although not illustrated, when the vacuum pumps 10a and 10b are provided as discrete vacuum pumps, the outer ends of the first supply line 22 and the second supply line 23 serve as the compressed air supply ports for the vacuum creation and the vacuum release. On the other hand, reference numeral 27 denotes a suction port provided at a region of the side wall of the housing 20. An element such as an adsorption pad is connected to the suction port so as to communicate with the vacuum chamber 21 through the suction port.

The ejector pump 30 is a general pipe-type pump having a first open end (i.e., front end) serving as a compressed air inlet port 31, a second open end (i.e., rear end) serving as a compressed air outlet port 32, and a plurality of air holes 33 formed in the side wall thereof and arranged along an axial direction so that the ejector pump 30 can communicate with the vacuum chamber 21 through the air holes 33. The ejector pump 30 includes a plurality of nozzles arranged in series inside thereof and further includes check valves disposed to correspond to the respective through holes 33. The check valves are opened and closed by the pressure of an air flow.

Specifically, the ejector pump 30 is inserted into the internal space of the vacuum chamber 21 through a rear opening 28 of the housing 20 from its inlet port (i.e., front end)) thereof. After being inserted, the injector pump 30 is fixed in a manner that the inlet port 31 of the ejector pump 30 is inserted into an end portion of the first supply line 22. A hollow closure member 50 receives the outlet port 32 of the ejector pump 30 and is coupled to the rear opening of housing 20 in a screwed manner while pressing the ejector pump 30 in an axial direction X-X. Accordingly, the ejector pump 30 is fixed in the vacuum chamber 21 so as not to move in the axial direction X-X.

In the present embodiment, the closure member 50 is a silencer including a cylindrical sound absorbing member 51 disposed therein.

The air filter 40 is a porous tubular filter. Specifically, the air filter 40 includes a mesh or non-woven filter body 41 made of a metal or a resin, and rib-connecting reinforcing members 42 provided on the outer circumferential surface of the filter body 41 and arranged in the axial direction. The rib-connecting reinforcing member 42 prevents deformation of the air filter 40 by supporting the load externally applied to the air filter 40. In addition, the air filter 40 includes an annular inner protrusion 43 provided at an end thereof. The annular inner protrusion 43 protrudes inward, i.e., toward the outer surface of the inlet port of the ejector pump 32 disposed inside the air filter 40. The annular inner protrusion (i.e., an inner rim) is provided with a plurality of holes 44 each extending through the inner protrusion in the axial direction of the air filter 40. In this structure, the vacuum release line extends through the second supply line 23, the hole 44, and the gap 24 arranged in this order.

On the one hand, the inner protrusion 43 and the hole 44 are considered the optimal elements that do not interfere with the vacuum release line while maintaining the gap between the ejector pump 30 and the air filter 40 that are coaxially arranged. However, the present invention is not limited thereto. Other various designs that can maintain the air filter 40 to be stably mounted in the vacuum chamber 21 will be possible.

In the present embodiment, the reinforcing members 42 are fitted on the outer surface of the air filter 40 at positions near the respective ends of the air filter 40, thereby pressing the end portions of the air filter 40 toward the outer surface of the ejector pump 30 at positions near the inlet port 31 and the outlet port 32, respectively. In this way, the air filter 40 can be fixed to the ejector pump 30 so as not to be easily separable. Alternatively, the air filter 40 may be designed such that it is fixed to the ejector pump 30 by the closure member 50 provided at the rear end of the ejector pump 30. However, the coupling structure using the reinforcing members is advantageous in terms that the air filter 40 can be easily and conveniently assembled with the ejector pump 30 only by fitting the reinforcing members on the outer surface of the air filter 40.

Specifically, the air filter 40 is configured such that the inner protrusion 43 of an end of the reinforcing member 42 is positioned to correspond to an annular stopper 34 provided on the outer surface of the inlet port 31 of the ejector pump 30, and the inner surface of the other end of the reinforcing member 42 is pressed against the outer surface of the inlet port 31 of the ejector pump 30. In this way, the air filter 40 is fixed to the outer surface of the ejector pump 30. The air filter 40 and the ejector pump 30 can be preliminarily assembled and are then mounted together in the vacuum chamber 21 at the time of assembling the vacuum pump and can be removed together from the housing 20 at the time of disassembling the vacuum pump.

This coupling structure of the air filter 40 and the ejector pump 30, which is described above, enables the air filter 40 to be easily mounted in and removed from the housing due to the gap 24 provided between the ejector pump 30 and the vacuum chamber 21. On the other hand, designing the vacuum release line using the air filter 140 is considered an effective way in terms that it is possible to stably maintain the vacuum release line.

In one embodiment of the present invention, a vacuum pump array 10 is constructed using two or more vacuum pumps 10a and 10b configured as described above. Specifically, the two or more vacuum pumps 10a and 10b are arranged in parallel. In this case, the housings 20 of the vacuum pumps 10a and 10b are integrally formed. That is, two assemblies, each including the air filter and the ejector pump, are provided in one housing. Particularly, in the vacuum pump array 10, the suction port 27 of one vacuum pump 10b is connected to communicate with the vacuum chamber 21 of the adjacent vacuum pump 10a, and the first supply line 22 and the second supply line 23 of the vacuum pump 10b are connected to the first supply line 22 and the second supply line 23 of the adjacent vacuum pump 10a, respectively.

That is, the compressed air supplied to the supply port 25 of the vacuum creation line is split to flow into the ejector pumps 30 of the vacuum pumps 10a and 10b through the first supply line 22 and the vacuum creation line, and the compressed air supplied to the supply port 26 of the vacuum release line is split to flow into the gaps 24 of the vacuum pumps 10a and 10b through the second supply line 23 and the vacuum release line. This vacuum pump array 10 is coupled to a vacuum transfer system by a bracket B. In this case, the compressed air is selectively supplied to one of the supply ports 25 and 26 as needed, for example, depending on whether vacuum creation is needed or vacuum release is needed.

Figure 5:
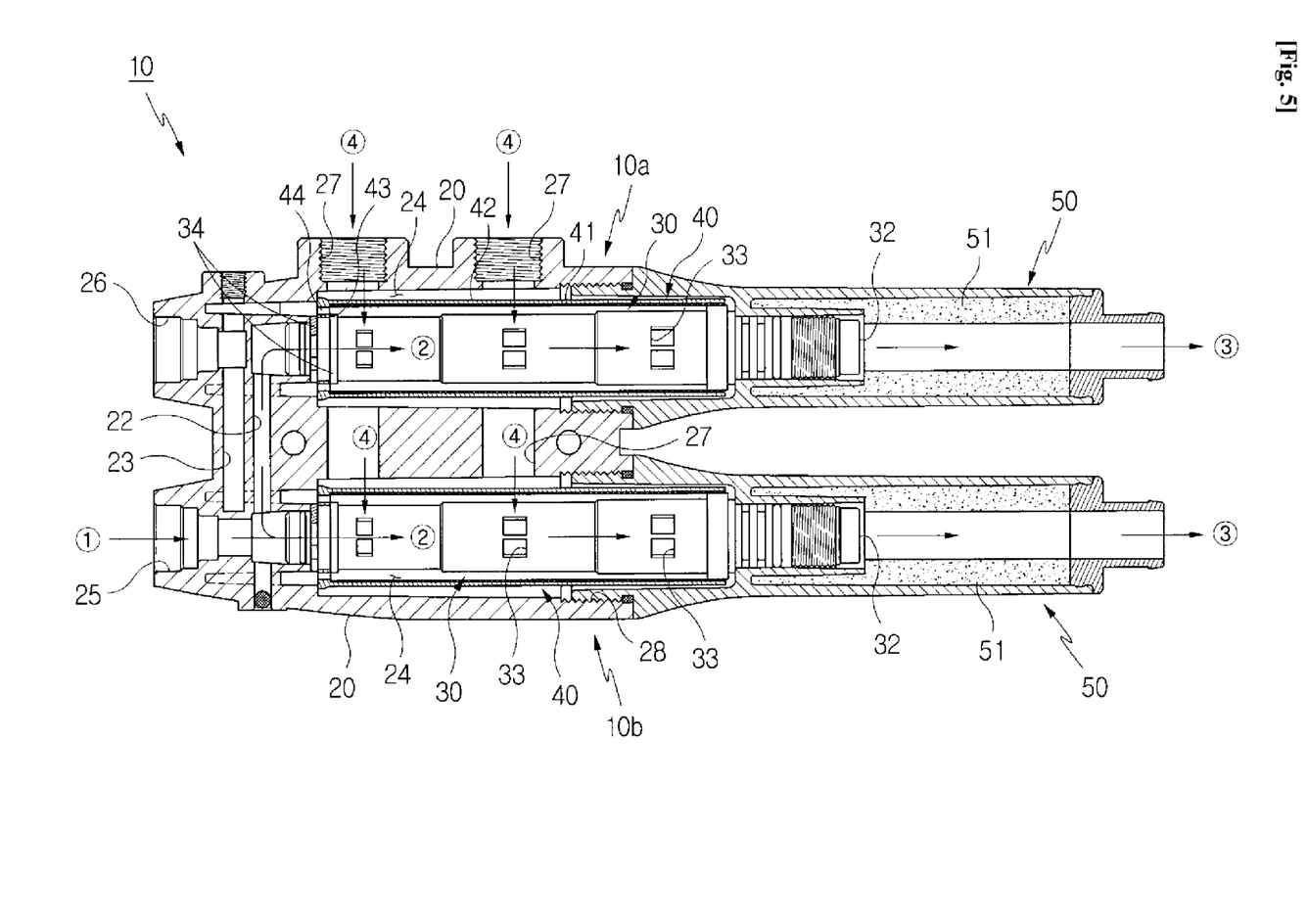
FIG. 5 is a view illustrating a vacuum creation operation of the vacuum pump according to one embodiment of the present invention.

Referring to FIG. 5, the compressed air (arrow (1)) supplied to the supply port 25 flows along the vacuum creation line (arrow (2)). The vacuum creation line is an air flow path sequentially passing through the first supply line 22 and the inlet ports 31 of the ejector pumps 30 of the vacuum pumps 10a and 10b. This compressed air passes through the ejector pumps 30 at a high speed and is discharged to the outside through the discharge port 32 (arrow (3)). In this case, the air in the internal space of the adsorption pad (not shown) connected to the suction port 27 is filtered by the air filter 40, then introduced into the ejector pumps 30 through the air holes 33 in a purified state, and finally discharged to the outside along with the compressed air (arrow (4)).

In this process, a vacuum or negative pressure is generated in the vacuum chamber 21 and the internal space of the adsorption pad, and the generated vacuum or negative pressure is used, for example, for adsorption-transferring a transfer target object adsorbed to the adsorption pad. On the other hand, in the process indicated by arrow (4), the foreign matter adhering to the surface of the transfer target object is detached from the surface of the transfer target object and is then filtered out by the air filter 40. During this process, the foreign matter is attached to the surface of the air filter 40.

Figure 6:
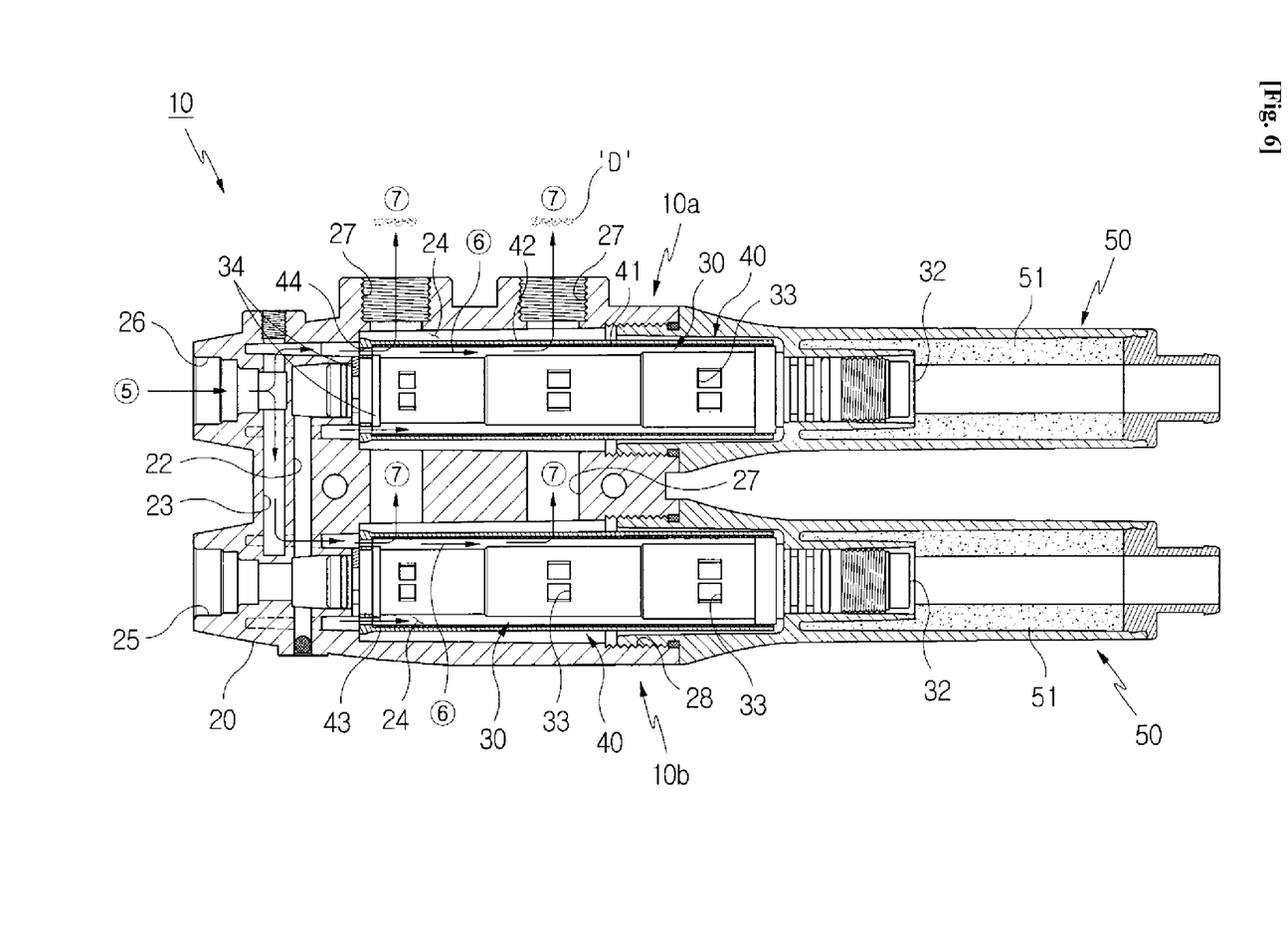
FIG. 6 is a view illustrating a vacuum release operation of the vacuum pump according to one embodiment of the present invention.

Referring to FIG. 6, the compressed air (arrow (5)) supplied to the supply port 6 flows along the vacuum release line (arrow (6)). This means, that the compressed air passes through the second supply line 23, then through the holes 44 of the inner rim of the air filter 40 of each of the vacuum pumps 10a and 10b, and axially flows along the gap 24 provided between the ejector pump 30 and the air filter 40. The compressed air is continuously supplied (arrow 7) to the internal space of the adsorption pad in which the vacuum or negative pressure.

In this process, the vacuum or negative pressure formed in the vacuum chamber 21 and the internal space of the adsorption pad is released, and the transfer target object adsorbed onto the adsorption pad is detached from the adsorption pad. Next, the vacuum pump array 10 is prepared for transfer of the next object to be transferred.

On the other hand, in the process indicated by the arrow (7), the compressed air is supplied in the reverse direction to the direction (arrow (4) in which the foreign matter is attached to the surface of the air filter 40. Therefore, the foreign matter D attached to the surface of the air filter 40 is detached and removed by the air flow. Through this operation, i.e., while the vacuum creation and the vacuum release are alternately and repeatedly performed, the air filter 40 is naturally cleaned without additional maintenance work of disassembling the vacuum pump, cleaning the air filter, and reassembling the vacuum pump.

In this case, the contaminated state or the cleaned state of the air filter 40 can be visually checked from the outside through the transparent window 29 formed at a region of the side wall of the housing 20. Therefore, even without disassembling the vacuum pumps 10a and 10b, it is possible to easily check how severely the air filter 40 is contaminated, whether it is time to replace the air filter 40, and whether the cleaning operation is normally performed.

Although the vacuum creation and release operations performed in the vacuum pump array 10 have been described with reference to FIGS. 5 and 6, this operation can also be carried out even in a case where the vacuum pumps 10a and 10b are implemented as discrete vacuum pumps. However, the vacuum pump array 10 in which two vacuum pumps are assembled is advantageous over two discrete vacuum pumps 10a and 10b in terms of doubling the vacuum creation efficiency while consuming substantially the same amount of energy.

The invention claimed is:

1. A vacuum pump comprising:
 a housing (20) having an internal vacuum chamber (21) and a side-mounted suction port (27) extending to the vacuum chamber (21);
 an ejector pump (30) mounted to axially extend in the vacuum chamber (21); and
 an air filter (40) coaxially arranged on an outer surface of the ejector pump (30),
 wherein the ejector pump (30) has an air hole (33) formed in a side wall thereof to communicate with the vacuum chamber (21), a first end serving as an inlet port (31), and a second end serving as an outlet port (32),
 the air filter (40) is a porous tubular filter, and
 the housing (20) has, as two separate compressed air supply lines, a vacuum creation line extending to the inlet port (31) via a first supply line (22) and a vacuum release line extending to a gap between the ejector pump (30) and the air filter (40) via a second supply line (23),
 wherein the air filter (40) includes a tubular filter body (41) and a rib-connecting reinforcing member (42) provided on an outer surface of the tubular filter body (41) to support a load externally applied to the air filter (40),
 the reinforcing member (42) includes an annular inner protrusion (43) protruding toward the outer surface of the inlet port (31) of the ejector pump (30) and a hole (44) extending through the inner protrusion (43), and
 the vacuum release line extends to the gap (24) via the second supply line (23) and the hole (44).

2. The vacuum pump according to claim 1, further comprising: a hollow closure member coupled to an opening of the housing to receive an outlet port side end of the ejector pump, thereby axially pressing and fixing the ejector pump disposed in the vacuum chamber.

3. The vacuum pump according to claim 2, wherein the closure member (50) is a silencer.

4. The vacuum pump according to claim 1, wherein the ejector pump (30) includes an annular stopper (34) disposed on the outer surface of the inlet port (31) and corresponding to the inner protrusion (43) of the air filter (40).

5. The vacuum pump according to claim 1, wherein the housing (20) is provided with one or more transparent windows (29) formed through the side wall thereof to allow a state of the air filter (40) to be visually checked from outside.

6. The vacuum pump according to claim 1, wherein the air filter is fixedly mounted on the outer surface of the ejector pump (30) in such a manner that both ends of the reinforcing member (42) are pressed against the inlet port (31) and the outlet port (32) of the ejector pump (30), respectively.

7. A vacuum pump array (10) comprising:
two or more vacuum pumps according to claim 1, the vacuum pumps being arranged in parallel and accommodated in an integrated housing (20),
wherein the suction port (27) of each of the vacuum pumps is connected to communicate with the vacuum chamber (21) of an adjacent vacuum pump of the vacuum pumps,
the first supply line (22) and the second supply line (23) of each of the vacuum pumps (30) are connected to the first supply line (22) and the second supply line (23) of the adjacent vacuum pump (30), respectively.

\* \* \* \* \*